United States Patent
Jin et al.

(10) Patent No.: US 11,513,545 B2
(45) Date of Patent: Nov. 29, 2022

(54) VOLTAGE CONVERTING CIRCUIT AND ASSOCIATED CHIP PACKAGE AND CONVERTING METHOD

(71) Applicant: Hangzhou Kiwi Instruments Corporation, Hangzhou (CN)

(72) Inventors: Weixiang Jin, Hangzhou (CN); Xiufeng Yu, Hangzhou (CN); Bo Zhang, Hangzhou (CN)

(73) Assignee: Hangzhou Kiwi Instruments Corporation, Hangzhou (CN)

( * ) Notice: Subject to any disclaimer, the term of this patent is extended or adjusted under 35 U.S.C. 154(b) by 113 days.

(21) Appl. No.: 17/095,510

(22) Filed: Nov. 11, 2020

(65) Prior Publication Data

US 2021/0067043 A1  Mar. 4, 2021

(30) Foreign Application Priority Data

Nov. 14, 2019 (CN) .......................... 201911115165.2

(51) Int. Cl.
| | |
|---|---|
| G05F 1/46 | (2006.01) |
| H02M 1/08 | (2006.01) |
| H02M 3/158 | (2006.01) |
| H02M 7/04 | (2006.01) |
| H02M 1/00 | (2006.01) |

(52) U.S. Cl.
CPC .............. *G05F 1/465* (2013.01); *H02M 1/08* (2013.01); *H02M 3/1584* (2013.01); *H02M 7/04* (2013.01); *H02M 1/0003* (2021.05)

(58) Field of Classification Search
None
See application file for complete search history.

(56) References Cited

U.S. PATENT DOCUMENTS

| | | | | |
|---|---|---|---|---|
| 4,827,151 A | * | 5/1989 | Okado .................... | H02J 9/062 307/66 |
| 8,450,961 B2 | * | 5/2013 | Sakakibara ......... | H02M 1/4216 318/504 |
| 10,148,191 B2 | * | 12/2018 | Yan ........................ | H02M 3/158 |
| 11,303,202 B2 | * | 4/2022 | Hiasa ..................... | H02M 1/32 |

FOREIGN PATENT DOCUMENTS

| | | |
|---|---|---|
| CN | 103066872 A | 4/2013 |
| CN | 105553297 A | 5/2016 |
| CN | 108111031 A | 6/2018 |
| EP | 2375445 A2 * | 10/2011 ......... H01L 27/0629 |
| JP | H05122938 A | 5/1993 |

* cited by examiner

*Primary Examiner* — Jeffrey A Gblende
(74) *Attorney, Agent, or Firm* — Perkins Coie LLP

(57) ABSTRACT

A non-isolating AC-DC voltage converting system has two voltage converters. The first voltage converter receives a bus voltage and turns on a power transistor when the bus voltage is at valley regions and to provide an interim voltage which is lower than the bus voltage. The second voltage converter receives the interim voltage and provides an output voltage of the AC-DC voltage converting system.

19 Claims, 5 Drawing Sheets

VOLTAGE CONVERTING CIRCUIT AND ASSOCIATED CHIP PACKAGE AND CONVERTING METHOD

CROSS-REFERENCE TO RELATED APPLICATION(S)

This application claims priority to and the benefit of Chinese Patent Applications No. 201911115165.2, filed on Nov. 14, 2019, which are incorporated herein by reference in its entirety.

TECHNICAL FIELD

The present invention relates generally to electronic circuit, and more particularly but not exclusively relates to non-isolating AC-DC voltage converting system and associated chip package and converting method.

BACKGROUND

In the field of Alternating-Current to Direct-Current (AC-DC) voltage converters, considering the high input voltage of mains power, isolated voltage converters are widely used. However, the cost of an isolated voltage converter is high and the system is complex due to the usage of voltage transformer. Accordingly, non-isolating AC-DC voltage converters are required. However, due to the high voltage of mains power, the power efficiency of a conventional non-isolating voltage converter is low. Besides, the isolation between high voltage and low voltage in a semiconductor die and signal processing are challenging and integration for non-isolating AC-DC voltage converter is low.

In view of at least one of the above deficiencies, an improved solution is required.

SUMMARY

In one embodiment, a voltage converting circuit used in a non-isolating AC-DC voltage converting system comprises: a first voltage converting module having an input and an output, the input of the first voltage converting module configured to receive a bus voltage, the output of the first voltage converting module configured to provide an interim voltage, the first voltage converting module configured to turn on a power transistor of the first voltage converting module when the bus voltage is at a valley region; and a second voltage converting module having an input and an output, the input of the second voltage converting module coupled to the output of the first voltage converting module to receive the interim voltage and the output of the second voltage converting module is configured to be coupled to one end of an inductor, wherein the other end of the inductor is configured to provide an output voltage.

In another embodiment, a chip package used in a non-isolating AC-DC voltage converting system comprises: a first die configured to turn on a power transistor of a first voltage converter when a bus voltage supplied to one end of the power transistor is at a valley region, the first voltage converter configured to provide an interim voltage at another end of the power transistor; and a second die comprising a switching transistor of a second voltage converter and a switching control circuit for controlling the switching transistor, the second voltage converter configured to convert the interim voltage into a direct-current output voltage.

And in yet another embodiment, a non-isolating AC-DC voltage converting method comprises: converting a bus voltage into an interim voltage by turning on a power transistor only or mainly at valley regions of the bus voltage; and converting the interim voltage into a regulated direct-current output voltage by a second voltage converter.

BRIEF DESCRIPTION OF THE DRAWINGS

Non-limiting and non-exhaustive embodiments are described with reference to the following drawings. The drawings are only for illustration purpose. Usually, the drawings only show part of the circuits/devices of the embodiments.

Figure 1:
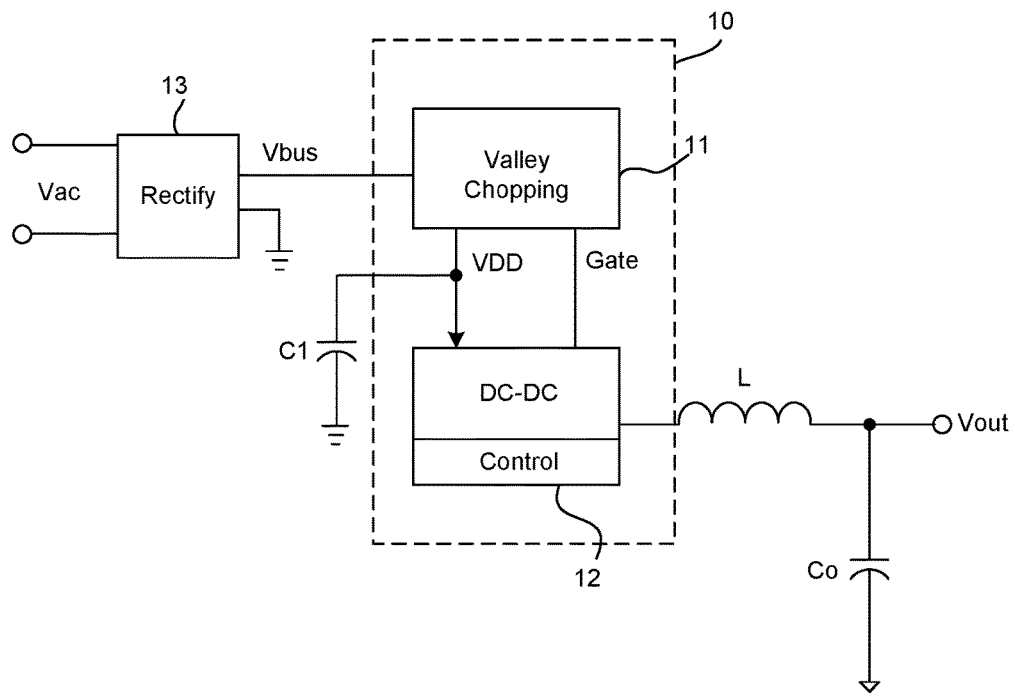
FIG. 1 illustrates a diagram of a non-isolating AC-DC voltage converting system according to an embodiment of the present application.

The drawings are only schematic and are non-limiting. In the drawings, the size is not drawn on scale.

DETAILED DESCRIPTION

Reference will now be made in detail to the preferred embodiments of the application, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Throughout the specification and claims, the term "couple" or "connect" as used herein, is defined as either directly, or indirectly connecting one to another via intermediary such as via electrical conducting materials which may have resistance, parasitic inductance or capacitance, or via other material(s) or component(s) as would be known to person skilled in the art without departure from the spirit and scope of the invention as defined by the appended claims.

Figure 7:
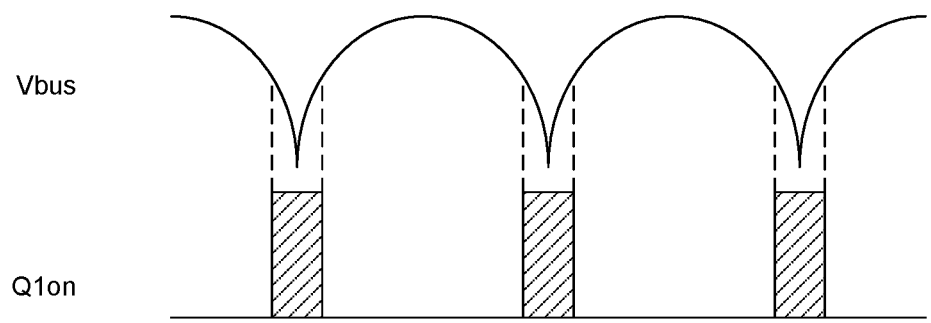
FIG. 7 illustrates a waveform diagram showing the transistor Q1 is in ON state only at valley regions of the bus voltage according to an embodiment of the present application.

FIG. 1 illustrates a block diagram of a non-isolating AC-DC voltage converting system according to an embodiment of the present application. The voltage converting circuit 10 of the non-isolating AC-DC voltage converting system comprises a first voltage converting module 11 and a second voltage converting module 12, wherein the input of the first voltage module 11 receives a bus voltage Vbus. The output of the first voltage module 11 is coupled to the first capacitor C1 for providing an interim voltage VDD. The first voltage converting module 11 turns on a power transistor Q1 of the first voltage converting module 11 when the bus voltage Vbus is in a valley region with reference to the shadowed region as illustrated in FIG. 7. A valley region means the region when the bus voltage Vbus is at a small value with reference to the amplitude of the bus voltage Vbus. For example, when the voltage Vbus is lower than ½ of the amplitude of voltage Vbus, or is part of such region. The input of the second voltage converting module 12 is coupled to the output of the first voltage converting module 11 for receiving the interim voltage VDD, the output of the second voltage converting module 12 is coupled to one end of an inductor L, and a second end of the inductor L is coupled to an output capacitor Co and providing a DC output voltage Vout across the output capacitor Co. The second voltage converting module 12 converts the interim voltage VDD into the DC output voltage Vout.

In topology, the non-isolating AC-DC voltage converting system comprises a first voltage converter and a second voltage converter, wherein the first voltage converter comprises the first voltage converting module 11 and the first capacitor C1, and the second voltage converter comprises at least part of the second voltage converting module 12, the inductor L and the output capacitor Co. In another embodiment, the output capacitor Co is integrated in a load which is supplied by the output voltage Vout. And in one embodiment, the first capacitor is not required.

Preferably, the first voltage converter is a valley chopping circuit which turns on the power transistor Q1 at valley regions of the bus voltage Vbus and turns off the power transistor Q1 when the bus voltage Vbus is at a higher level, in order to convert the bus voltage Vbus into a lower interim voltage VDD, and the power transistor Q1 of the valley chopping circuit works mainly in switching state. By turning on power transistor Q1 only or mainly at the valley regions of Vbus, the power loss of the voltage converting system is greatly decreased. Preferably, the bus voltage Vbus is a rectified half sinusoidal voltage by rectifying the AC voltage from the mains power. In one embodiment, the amplitude of the bus voltage Vbus is about 220 volts. The valley chopping circuit converting the bus voltage in high level into a much lower interim voltage such as 20-40 volts. The second voltage converter is a Direct-Current to Direct-current (DC-DC) voltage converter. The DC-DC voltage converter converts the interim voltage VDD into a precisely regulated DC voltage Vout for supplying the load.

In one embodiment, the first voltage converting module 11 comprises a power transistor of the valley chopping circuit and a driving circuit for driving the power transistor. The driving circuit amplifies a control signal and provides a driving signal suitable for driving the power transistor. In one embodiment, the second voltage converting module 12 comprises a switching transistor of a DC-DC voltage converter and a switching control circuit for controlling the switching transistor, and the second voltage converting module 12 does not comprise the inductor L and the output capacitor Co. Preferably, the second voltage converting module 12 further comprises a chopping control circuit for controlling the power transistor of the valley chopping circuit. In one embodiment, the first voltage converting module 11 is integrated in a same semiconductor integrated circuit and the second voltage converting module 12 is integrated in another semiconductor integrated circuit.

In another embodiment, the second voltage converting module 12 comprises a switching transistor of the DC-DC voltage converter and a rectifying transistor, and the second voltage converting module 12 does not comprise a switching control circuit for controlling the switching transistor, the inductor L and the output capacitor wherein the switching control circuit can be manufactured in the first voltage converting module 11. In another embodiment, the second voltage converting module 12 comprises a switching transistor of the DC-DC voltage converter and a switching control circuit for controlling the switching transistor.

In one embodiment, the first voltage converting module 11 comprises a first semiconductor module (or called a first die) manufactured on a first semiconductor substrate, and the second voltage converting module 12 comprises a second semiconductor module (or called a second die) manufactured on a second semiconductor substrate, wherein the first semiconductor module comprises a power transistor and a driving circuit for driving the power transistor. In another embodiment, the first voltage converting module 11 comprises a first semiconductor module manufactured on a first semiconductor substrate and a semiconductor transistor module manufactured on a third semiconductor substrate, wherein on the first semiconductor module, a driving circuit for driving the power transistor is manufactured, and on the semiconductor transistor module the power transistor of the first voltage converter is manufactured. In one embodiment, since the bus voltage Vbus is much higher than the interim voltage VDD, the first semiconductor module has a first withstanding voltage, the second semiconductor module has a second withstanding voltage, and the first withstanding voltage is twice higher than the second withstanding voltage. Or in other words, the withstanding voltage required for the second semiconductor module is greatly decreased.

Signal communication is established between the first voltage converting module 11 and the second voltage converting module 12. Preferably, a communicational control signal Gate is transmitted between the first voltage converting module 11 and the second voltage converting module 12 for coupling to and controlling a power transistor or a switching transistor. Specifically, the control signal Gate is for controlling the power transistor of a valley chopping circuit or the switching transistor of a DC-DC voltage converter.

Preferably, the second semiconductor module 12 comprises a chopping control circuit which provides a chopping control signal based on the interim voltage VDD for controlling the power transistor of a valley chopping circuit, and also comprises a switching control circuit for controlling a switching transistor of a DC-DC voltage converter. The second semiconductor module 12 provides a communicational control signal Gate, and the first semiconductor module 11 receives the communicational control signal Gate. And the first semiconductor module comprises a driving circuit wherein the input of the driving circuit receives the control signal Gate, and the output of the driving circuit is coupled to a control end of the power transistor of the first voltage converting module 11.

The first voltage converting module 11 may further comprise one or more of the followings: an input voltage sensing circuit configured to sense the bus voltage Vbus; a self-powering circuit configured to supply power for the second voltage converting module 12 before the first voltage converting module 11 entering into normal working state; an active bleeder circuit configured to provide bleeding path for the bus voltage Vbus. And all these circuits may be made of components which are suitable to work under high voltage.

In this way, by arranging the driving circuit of a first voltage converter such as a valley chopping circuit, and the control circuit of the first voltage converter in two separate semiconductor substrates, the first semiconductor module can only comprise components which can withstand high voltage, and the second semiconductor module 12 comprise components all working in voltage much lower than the bus voltage, and thus the high-voltage components and the low-voltage components are distributed in two different semiconductor substrates. And accordingly, the complexity of signal processing and semiconductor manufacturing processing are reduced. For example, no isolation structures are required between the high-voltage regions and the low-voltage regions otherwise required between the high-voltage regions and the low-voltage regions in a single semiconductor substrate.

In one embodiment, the voltage converting circuit 10 are manufactured in a chip package, and the chip package comprises the first voltage converting module 11 and the second voltage converting module 12. And the first voltage converting module 11 and the second voltage converting module 12 are manufactured in two separate semiconductor dies.

As illustrated in FIG. 1, the voltage converting system further comprises a rectifying circuit 13, the inductor L and the output capacitor Co, wherein two inputs of the rectifying circuit 13 receives an alternating-current power source Vac, and an output of the rectifying circuit 13 is coupled to the input of the first voltage converting module 11 configured to provide the bus voltage Vbus. The rectifying circuit 13, the inductor L, the first capacitor C1 and the output capacitor Co can also be deemed as part of a voltage converting circuit. The output of the rectifying circuit 13 may further coupled to an input capacitor. The output of the second voltage converting module 12 is coupled to a first end of inductor L, and a second end of inductor L is coupled to an output capacitor Co, and wherein the voltage across the output capacitor Co is the output voltage of the voltage converting circuit 10. In one embodiment, a valley chopping circuit comprises the first voltage converting module 11, the first capacitor C1 and a chopping control circuit in the second voltage converting module 12, and a DC-DC voltage converter comprises a switching transistor and a switching control circuit in the second voltage converting module 12, inductor L and the output capacitor Co. In one embodiment, the DC-DC voltage converter comprises a buck converter. In one embodiment, by coupling the pins of the chip package 10 to peripheral components in different ways, the voltage converting system can either be configured as a buck converter, or can also be configured as a buckboost converter compatibly. Details will be described in the following text.

Figure 2:
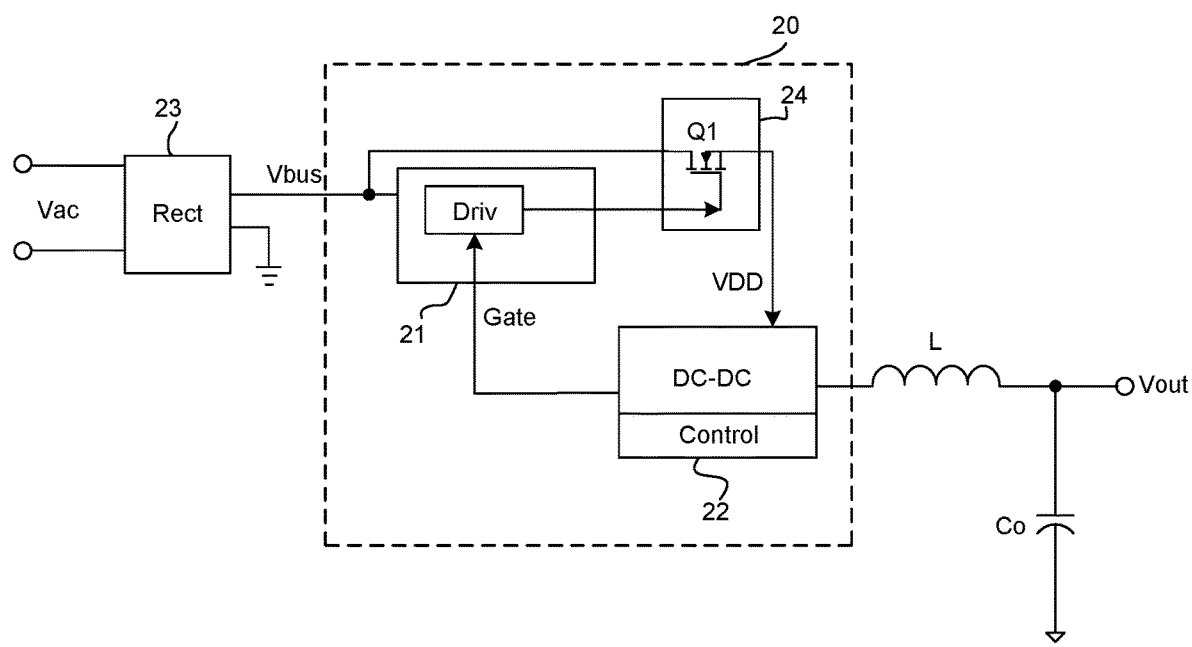
FIG. 2 illustrates a diagram of a non-isolating AC-DC voltage converting system according to another embodiment of the present application.

FIG. 2 illustrates a block diagram of a non-isolating AC-DC voltage converting system according to another embodiment of the present application. A voltage converting circuit 20 of the non-isolating AC-DC voltage converting system comprises a first voltage converting module and a second voltage converting module 22, and wherein the first voltage converting module comprises a circuit module 21 and a transistor module 24. The transistor module 24 comprises a power transistor Q1 of a first voltage converter.

Preferably, the circuit module 21 is fabricated on a first semiconductor substrate to form a first semiconductor module 21, the second voltage converting module 22 is fabricated on a second semiconductor substrate to form a second semiconductor module 22 and the power transistor Q1 is fabricated on a third semiconductor substrate to form a semiconductor transistor module 24. In one embodiment, the circuit module 21 comprises a driving circuit for driving the power transistor Q1 of a valley chopping circuit, the semiconductor transistor module 24 comprises the power transistor Q1 of the valley chopping circuit, and the second semiconductor module 22 comprises the switching transistor of a DC-DC voltage converter and a control circuit, and wherein the control circuit provides a first control signal for controlling the switching transistor of the DC-DC voltage converter and a second control signal for controlling the power transistor Q1. A first terminal of the power transistor Q1 is coupled to the first semiconductor module 21 and receives a bus voltage Vbus, a second terminal of the power transistor Q1 is coupled to the second semiconductor module 22 to provide an interim voltage VDD, and a control terminal of the power transistor Q1 is coupled to an output of the first semiconductor module 21 to be driven by a driving circuit in the first semiconductor module 21.

In one embodiment, the voltage converting circuit 20 comprises a chip package, and the chip package comprises a first die 21, a second die 22 and a third die 24. Where the first die resists a first voltage and the second die resist a second voltage and wherein the first voltage is twice higher than the second voltage.

In one embodiment, the first voltage converting module comprises only components that do not require additional stable low power supply and can work under high voltage. With the control circuit for controlling the power transistor Q1 manufactured in the second die 22, the first die 21 and the third die 24 can be manufactured with components all of which can resist high voltage and no complex isolation structures or signal processing are required.

Figure 3:
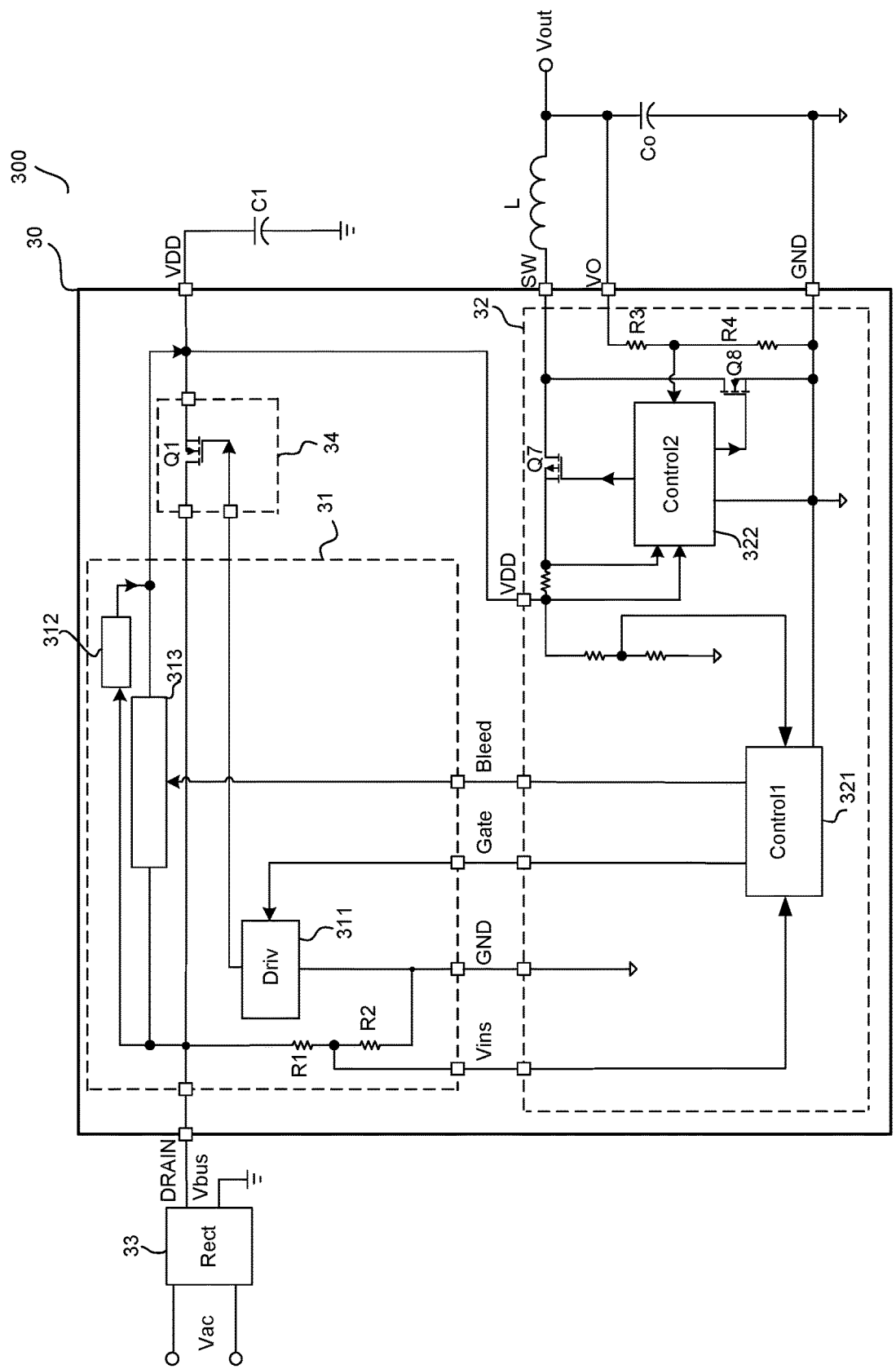
FIG. 3 illustrates a circuit diagram of a non-isolating AC-DC voltage converting system according to an embodiment of the present application.

FIG. 3 illustrates a voltage converting circuit 30 in an AC-DC voltage converting system 300. The AC-DC voltage converting system 300 comprises a rectifying circuit 33, the voltage converting circuit 30, a first capacitor C1, an inductor L and an output capacitor Co. The AC-DC voltage converting system 300 as illustrated in FIG. 3 can also be called a voltage converting circuit. The voltage converting circuit 30 can be in the form of a chip package. The voltage converting circuit 30 comprises a first voltage converting module and a second voltage converting module 32, and wherein the first voltage converting module comprises a circuit module 31 and a power transistor Q1. Preferably, each of the circuit module 31, the power transistor Q1 and the second voltage converting module 32 is in the form of a die, and wherein the voltage converting circuit 30 comprises a first die 31 or called a first semiconductor module, a second die 32 or called a second semiconductor module and a third die 34 or called a semiconductor transistor module. The circuit module 31 having a terminal DRAIN coupled to the output of the rectifying circuit 33 for receiving the bus voltage Vbus. The circuit module 31 comprises a driving circuit 311 which receives a communicational control signal Gate provided by the second voltage converting module 32. The driving circuit 311 amplifies the control signal Gate and the output of the driving circuit 311 is coupled to the control end of the power transistor Q1 for turning ON and OFF of the power transistor Q1. As illustrated in FIG. 3, the circuit module 31 may further comprises an input voltage sensing circuit comprising resistors R1 and R2 for sensing the bus voltage Vbus, a self-powering circuit 312 and an active bleeding circuit 313. In one embodiment, the resistance of R1 is much higher than that of R2, for example, R1=19*R2, and thus the input voltage sensing signal Vins is much lower than the bus voltage Vbus. The self-powering circuit 312 supplies power to the second voltage converting module 32 before the valley chopping circuit enters into normal operation state. The active bleeding circuit 313 may further receive a bleeding control signal provided by the second voltage converting module 32 and forms a bleeding path for the bus voltage Vbus. The circuit module 31 may only comprise the driving circuit 311 and one or more of the input voltage sensing circuit, the self-powering circuit 312 and the active bleeding circuit 313. The driving circuit 311, the input voltage sensing circuit, the self-powering circuit 312 and the active bleeding circuit 313 each may have any suitable or prior art configuration. The circuit module 31 does not require a power supply circuit for supplying a control circuit, since the control circuits are manufactured in the second voltage converting module 32 and thus the semiconductor processing method is simple. Besides, all components in circuit module 31 can withstand high voltage and no isolation structures for isolating high-voltage region and low-voltage region in a semiconductor substrate is required in the first die 31. The circuit module 31 may be manufactured by semiconductor processing method for high withstanding voltage components. Since the interim voltage VDD is much lower than the bus voltage Vbus and the control circuits are fabricated in the second voltage converting module 32, the high-voltage circuit and the low-voltage circuit are physically isolated in two dies, and the system complexity and cost are aimed to be greatly reduced.

The second voltage converting module 32 comprises a switching transistor Q7 of a DC-DC voltage converter and a control circuit, wherein the control circuit comprises a chopping control circuit 321 which provides a chopping control signal Gate for controlling the power transistor Q1 of the valley chopping circuit, and the control circuit further comprises a switching control circuit 322 for controlling the switching transistor Q7. In one embodiment, the chopping control circuit controls the power transistor to be turned ON when the bus voltage Vbus is lower than a threshold or is in a valley region, and thus the interim voltage VDD is controlled below a predetermined value or having a predetermined low value compared to the bus voltage Vbus.

FIG. 7 illustrates a waveform diagram showing that the power transistor Q1 is in ON state only at the valley regions of the bus voltage Vbus according to an embodiment of the present application. The upper waveform illustrates the value of the bus voltage Vbus and the lower waveform illustrates the state of the power transistor Q1. The shadow region represents when the power transistor Q1 is in ON state. A valley region of the bus voltage Vbus may represent the region when the bus voltage Vbus is lower than a threshold such as ⅓ or lower of the amplitude (the peak value) of the bus voltage Vbus. In another embodiment, the bus voltage enters a valley region when the bus voltage decreases below a first threshold and leaves out of the valley region when the bus voltage increases above a second threshold. In one embodiment, the first threshold and the second threshold are adjusted according to the interim voltage VDD or other signals. Accordingly, the interim voltage VDD is much lower than the amplitude of the bus voltage Vbus. And since the power transistor Q1 is in ON state only when the bus voltage Vbus is low, the power loss consumed by the power transistor Q1 is also low and the system efficiency is improved. A valley chopping control may not preclude the possibility that the power transistor Q1 is also turned on randomly at a high region of the Vbus for particularly purpose, however, the ON state of the power transistor Q1 is mainly at the bottom region of the bus voltage Vbus.

Continuing with FIG. 3, the switching control circuit 322 controls the duty cycle of the switching transistor Q7 at least based on the output voltage Vout, and regulates the output voltage Vout at a predetermined value. The second voltage converting module 32 may further comprises a synchronous rectifying transistor Q8 which is coupled to the switching transistor Q7. One end of the switching transistor Q7 is coupled to a second end of the power transistor Q1 to receive the interim voltage VDD, and a second end of the switching transistor Q7 is coupled to one end of the rectifying transistor Q8, and a second end of the rectifying transistor Q8 is coupled to the reference ground GND. The second voltage regulating module 32 may further comprise output voltage sensing circuit comprising resistors R3 and R4 for sensing the output voltage Vout and further regulates the output voltage Vout.

In one embodiment, the first die 31 resists a first voltage of the peak value of the bus voltage Vbus (peak value of Vbus to reference ground GND), and the second die 32 resists a second voltage of the interim voltage VDD (VDD to GND). In one embodiment, the bus voltage Vbus is twice higher than the interim voltage VDD. For example, the peak value of the bus voltage Vbus is higher than 200 volts and the interim voltage VDD is about 30 volts. Accordingly, the first voltage is much higher than the second voltage, and the first die 31 has high requirement in high-voltage resistance and the second die 32 has low voltage resistance requirement. By fabricating all the control circuits 311 and 322 which work under low voltage in the second die 32, the complexities in signal processing and semiconductor processing are reduced. In one embodiment, the first die does not have control signal generators and requires no additional power supply circuit and the system manufacturing complexity is reduced.

Preferably, the voltage converting circuit 30 is encapsulated in a chip package. The chip package 30 has five pins: DRAIN, VDD, SW, GND and VO respectively, wherein the first pin DRAIN is externally coupled to an input power source or the output of the rectifying circuit 33 to receive the bus voltage Vbus, and is internally coupled to a first end of the power transistor Q1 of the valley chopping circuit. Preferably, the power transistor comprises a field effect transistor, such as a MOSFET (Metal Oxide Semiconductor Field Effect Transistor), and wherein the first pin DRAIN is coupled internally to the drain of the power transistor Q1. The second pin VDD provides the interim voltage VDD which is converted by a valley chopping circuit from the bus voltage Vbus. Preferably, the interim voltage VDD is provided at the drain of the power transistor Q1. The third pin SW provides a switching signal at a common node coupled between the switching transistor Q7 and rectifying transistor Q8, and the third pin SW is coupled to inductor L externally. The fourth pin GND is coupled to a reference ground, and is internally coupled to the ground terminal of the first control circuit 321 and the second control circuit 322. The fifth pin VO is to receive a sensing signal indicative of the output voltage Vout, and to provide an output voltage sensing signal to the second control circuit 322. The rectifying circuit 33 has an input to receive the AC power source Vac and provides the bus voltage Vbus between a first output and a second output. The first output of the rectifying circuit 33 is coupled to the first pin DRAIN, a first end of a first capacitor C1 is coupled to the second pin VDD, and the other end of the first capacitor C1 is coupled to the second output of the rectifying circuit 33. A first end of inductor L is coupled to the third pin SW and a first end of output capacitor Co is coupled to the other end inductor L and the fifth pin VO, and the other end of the output capacitor Co is coupled to the fourth pin GND. The output capacitor Co is used to provide the output voltage Vout of the AC-DC voltage converting system 300.

In one embodiment, by coupling the pins of the chip package to peripheral discrete components in different ways, the DC-DC voltage converter in the AC-DC voltage converting system can either form a buck converter with positive output, or form a buckboost converter with negative output. The circuit in FIG. 3 is compatible in two connecting configurations, the first one is to coupling the second end of the first capacitor C1 to the fourth pin GND which is also the second end of the output capacitor Co and the second voltage converter works as a buck converter with positive output, and the second one is to coupling the second end of the first capacitor C1 to the fifth pin VO which is also the first end of the output capacitor Co to make the second voltage converter work as a buckboost converter with negative output.

Figure 4:
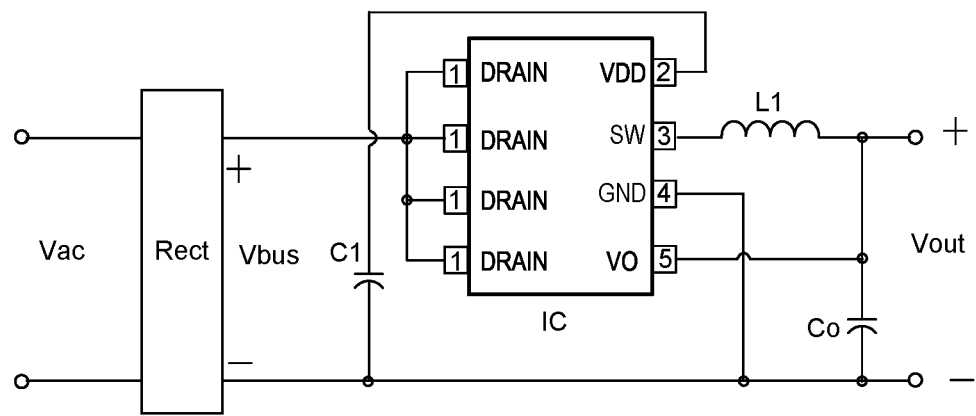
FIG. 4 illustrates a first connecting configuration between a chip package and the peripheral discrete components according to an embodiment of the present application.
Figure 5:
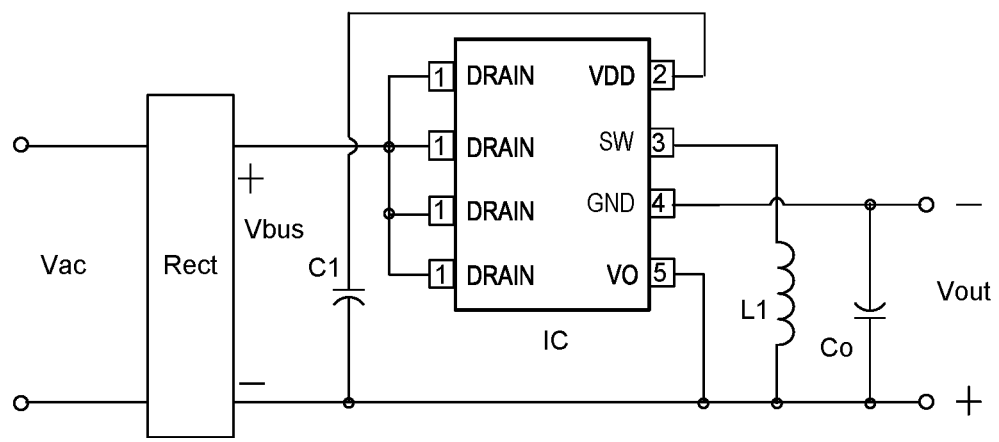
FIG. 5 illustrates a second connecting configuration between a chip package and the peripheral discrete components according to an embodiment of the present application.

FIG. 4 and FIG. 5 illustrates a chip package IC having two connecting configurations with peripheral components in non-isolating AC-DC voltage converting systems according to an embodiment of the present application. FIG. 4 illustrates a first connecting configuration, wherein the first pin DRAIN of the IC is coupled to a first output of the rectifying circuit to receive the bus voltage Vbus, the second pin VDD is coupled to one end of a first capacitor C1, and the other end of C1 is coupled a second output of the rectifying circuit (ground). The third pin SW is coupled to one end of inductor L, and the other end of inductor L is coupled to one end of output capacitor Co and the fifth pin VO, and the other end of capacitor Co is coupled the fourth pin GND and the other end of the first capacitor C1. With this configuration, the DC-DC voltage converter in the AC-DC voltage converting system forms a buck converter, and the sensing signal of the interim voltage VDD supplied to a chopping control circuit has a reference ground at pin GND. Accordingly, the interim voltage is controlled at a value Vref with reference to reference ground GND, and the output voltage Vout fulfills: Vout=duty*VDD=duty*Vref, wherein duty represents the duty cycle of the pulse width modulation signal for controlling the switching transistor Q7, and Vout is lower than the interim voltage VDD.

FIG. 5 illustrates a second connecting configuration, wherein the first pin DRAIN of the IC is coupled to a first output of the rectifying circuit to receive the bus voltage Vbus, the second pin VDD is coupled to one end of a first capacitor C1, and the other end of C1 is coupled a second output of the rectifying circuit (ground) and the fifth pin VO. The third pin SW is coupled to one end of inductor L, and the other end of inductor L is coupled to one end of output capacitor Co and the fifth pin VO, and the other end of capacitor Co is coupled the fourth pin GND. With this configuration, the DC-DC voltage converter in the AC-DC voltage converting system forms a buckboost converter, and the sensing signal of the interim voltage VDD supplied to a chopping control circuit is a differential voltage with reference to the voltage at pin VO. Accordingly, the interim voltage VDD can be controlled at a predetermined value Vref with reference to reference ground at pin VO, and the output voltage Vout fulfills: Vout=−duty/(1−duty)*Vref, wherein duty represents the duty cycle of the pulse width modulation signal for controlling the switching transistor Q7, and the output voltage Vout is a negative voltage. The interim voltage VDD can be either higher or lower than the reference voltage Vref. And accordingly, by adapting the voltage converting circuit 30 or the IC 30 to these two compatible configurations with peripheral components, the range of the output voltage Vout is broadened with a predetermined interim voltage VDD and the same IC package 30.

As illustrated in FIG. 4 and FIG. 5, the first pin DRAIN of the chip package IC comprises a plurality of sub-pins, and the plurality of sub-pins DRAIN are at a first side of the package (left side as illustrated), and the second pin VDD, the third pin SW, the fourth pin GND and the fifth pin VO are on a second side opposite to the first side of the package which facilitates the electrical isolation between the high-voltage die and low voltage die, and facilitates high current carrying ability and thermal dissipation by the first pin DRAIN.

Figure 6:
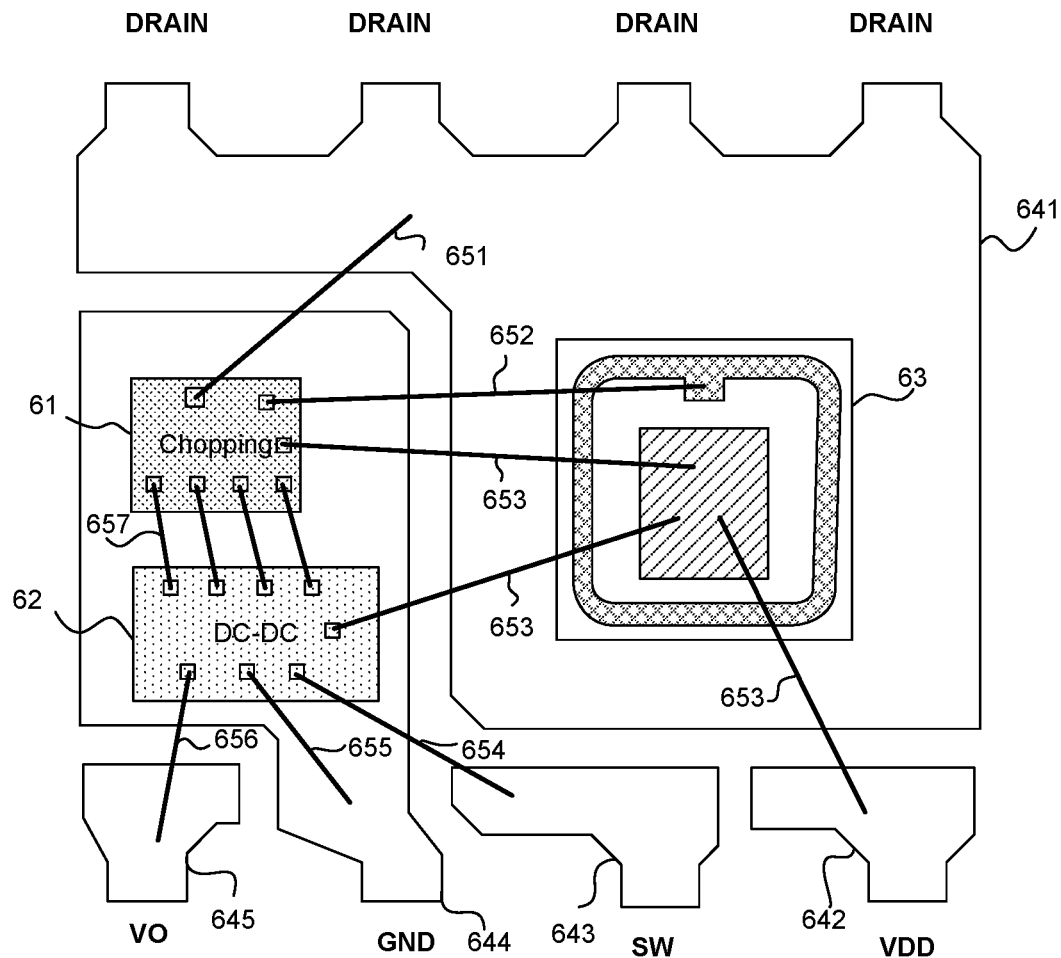
FIG. 6 illustrates a structure diagram of a chip package in a non-isolating AC-DC voltage converter according to an embodiment of the present application.

FIG. 6 illustrates a structural diagram of a chip package used in a non-isolating AC-DC voltage converting system. The chip package comprises five pins: a first pin DRAIN, a second pin VDD, a third pin SW, a fourth pin GND a fifth pin VO. The chip package comprises a first die 61, a second die 62 and a third die 63. Wherein the first die 61 is configured to receive a bus voltage through a first pin DRAIN and resists a first voltage. In one embodiment, the first voltage is the amplitude of the bus voltage. In one embodiment, the first die 61 comprises a driving circuit configured to provide a driving voltage for driving the power transistor Q1 at the third die 63. The third die 63 comprises the power transistor Q1 of the first voltage converting module. The first die 61 and the third die 63 convert the high-voltage bus voltage at the input pin DRAIN into a lower interim voltage VDD. The second die 62 is coupled to the third die 63 for receiving the interim voltage VDD through electrical connecting structure 653, and is further coupled to the output pin SW of the second voltage converting module, and is further coupled to the output of the AC-DC voltage converting system to provide an output voltage. The second die 62 comprises the second voltage converting module and resist a second voltage. In one embodiment, the second die 62 is used to converts the interim voltage VDD into a regulated DC output voltage with predetermined voltage value. The second die 62 provides switching signal at switching terminal SW which is further coupled to the switching pin SW, and to provide the output voltage by coupling the switching pin SW with the peripheral discrete components such as an inductor L and an output capacitor. In one embodiment, the bus voltage is twice higher than the interim voltage, and thus the first voltage is twice higher than the second voltage. In one embodiment, the voltage amplitude of the bus voltage is about 220 volts and the voltage amplitude of the interim voltage is about 20-40 volts, and the first voltage can be as high as 10 times of the interim voltage. Accordingly, the withstanding voltage required for the second die 62 is much lower than that for the first die 61. The separation of the first die 61 and the second die 62 allows the components with different withstanding voltages distributed in different dies, and facilitates the high-precision components manufactured on the second die 62, for example, the control circuits for the first converter and the second converter are both manufactured on the second die 62, and accordingly, the system performance is improved and semiconductor processing complexity is decreased. The chip package further comprises a plurality of electrical connecting structures such as bonding wires 651-657 which are coupled among and electrically communicated among the first die 61, the second die 62, the third die 63 and the pins. The electrical connecting structures may also be in the forms of metal bumps in a flip-die package. The chip package may further comprise a lead frame comprising lead frame parts 641-645 in order to support the dies 61-63 and form the pins. The first lead frame part 641 is used to support the third die 63, and the first lead frame part 641 is electrically isolated from the other lead frame parts 642-645. In one embodiment, the third die 63 comprises a field effect transistor, wherein a first surface (front surface) of the die 63 has a gate of the power transistor which is coupled to the electrical connecting structure 652 to receive a control signal, and a source of the power transistor which is coupled to the electrical connecting structure 653 to provide the interim voltage, and a second surface (back surface) opposite to the first surface of the die 63 has a drain of the power transistor. The second surface of the die 63 is attached on the first lead frame part 641 to form an electrical path between the drain of the power transistor and the first lead frame part 641 and also provide a thermal dissipation area by the first lead frame part 641. The first lead frame part 641 comprises a main portion and a pin portion, wherein the main portion is to support the third die 63, and the pin portion extends from a first side of the chip package to form the first pin DRAIN. The other pin portions of other lead frame parts extends from a second side opposite to the first side of the chip package to form the other pins to electrically coupled with other peripheral components. The second lead frame part 642 comprises a second pin VDD extending from the second side of the package to provide the interim voltage. The third lead frame part 643 comprises a third pin SW extending from the second side of the package and is coupled to a first end of an inductor, and wherein the second end of the inductor is coupled to an output capacitor and provides the output voltage of the AC-DC voltage converting system. The first die 61 and the second die 62 are mounted on a forth lead frame parts 644, and the fourth lead frame parts further comprises a fourth pin GND extending from the second side of the package and the fourth pin GND is used as the reference ground of the dies 61 and 62. The fifth lead frame part 645 comprises a fifth pin VO extending from the second side, and the fifth pin VO is to sense the output voltage of the AC-DC voltage converting system. In another embodiment, the chip package does not comprise a lead frame and the dies are electrically coupled to the peripheral components by flip die bumps. With such configuration as illustrated in FIG. 6, the high-voltage circuits and the low-voltage circuits are isolated physically, and the first pin DRAIN has high current carrying ability and high thermal dissipation ability.

Figure 8:
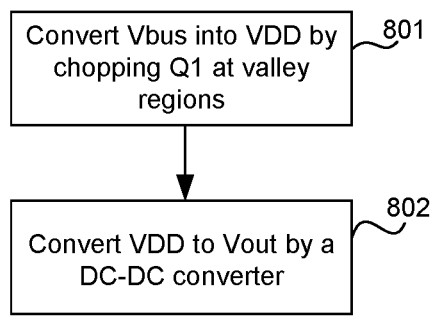
FIG. 8 illustrates a flow chart diagram for a non-isolating AC-DC voltage converter according to an embodiment of the present application.

FIG. 8 illustrates a flow chart diagram of a non-isolating AC-DC voltage converting method according to an embodiment of the present application. The non-isolating AC-DC voltage converting method comprises in step 801 converting a bus voltage Vbus into an interim voltage VDD by turning on a power transistor Q1 only or mainly at valley regions of the bus voltage Vbus; and at step 802 converting the interim voltage VDD into a regulated direct-current output voltage Vout by a DC-DC voltage converter. A valley region means the voltage is low, for example, during when the bus voltage is lower than a threshold. In another embodiment, the bus voltage enters a valley region when the bus voltage decreases below a first threshold and leaves the valley region when the bus voltage increases above a second threshold. In one embodiment, the first threshold and the second threshold are adjusted according to the interim voltage. By turning on the power transistor only or mainly at the valley regions of the bus voltage, the voltage across the power transistor is low and the power loss of the power transistor is low, and an interim voltage is obtained which is much lower than the bus voltage. Accordingly, the AC-DC voltage converting system has high efficiency. Preferably, the first voltage converter comprises a chopping circuit to selectively chop the bus voltage and obtain the interim voltage.

The non-isolating AC-DC voltage converting method may further comprise manufacturing a driving circuit of the power transistor and a control circuit for providing a control signal to an input of the driving circuit at two different semiconductor substrates. The low-voltage interim voltage is used as an input voltage of the DC-DC voltage converter, and thus the voltage resistance requirement for the second voltage converter is low. And accordingly, the control circuit for controlling the power transistor of the first voltage converter and the switching transistor of the second voltage converter can be manufactured on a same semiconductor substrate, and thus high-voltage die and low-voltage die are physically isolated and signal precision can be improved for the control circuits which leads to higher precision control for the output voltage of the AC-DC voltage converting system.

The non-isolating AC-DC voltage converting method may further comprise coupling the output of the first voltage converter to a first end of a first capacitor and selectively coupling the second end of the first capacitor to a first end (first end coupled to the inductor) or the other end of an output capacitor of the second voltage converter to compatibly form the second voltage converter as a buck converter or a buckboost converter.

The advantages and effects in the description may not show in specific examples considering variable conditions and the results may further affected by other factors not mentioned.

It will be appreciated by persons skilled in the art that the present invention is not limited to what has been particularly shown and described herein above. Rather the scope of the present invention is defined by the claims and includes both combinations and sub-combinations of the various features described herein above as well as variations and modifications thereof which would occur to persons skilled in the art upon reading the foregoing description and which are not in the prior art.

We claim:

1. A voltage converting circuit used in a non-isolating Alternating-Current to Direct-Current (AC-DC) voltage converting system, the voltage converting circuit comprising:

a first voltage converting module having an input and an output, the input of the first voltage converting module configured to receive a bus voltage, the output of the first voltage converting module configured to provide an interim voltage, the first voltage converting module configured to turn on a power transistor of the first voltage converting module when the bus voltage is at a valley region; and a second voltage converting module having an input and an output, the input of the second voltage converting module coupled to the output of the first voltage converting module to receive the interim voltage and the output of the second voltage converting module configured to be coupled to a first end of an inductor, wherein a second end of the inductor is configured to provide a direct-current output voltage, and wherein the second voltage converting module comprises a switching transistor, a switching control circuit for controlling the switching transistor and a chopping control circuit configured to provide a chopping control signal, and wherein the chopping control signal is supplied to the first voltage converting module for controlling the power transistor.

2. The voltage converting circuit of claim 1, wherein the first voltage converting module comprises a first semiconductor module manufactured on a first semiconductor substrate, the second voltage converting module is manufactured on a second semiconductor substrate to form a second semiconductor module, and wherein a communicational control signal is transmitted between the first semiconductor module and the second semiconductor module.

3. The voltage converting circuit of claim 2, wherein the second semiconductor module provides the communicational control signal, and the first semiconductor module receives the communicational control signal for controlling the power transistor.

4. The voltage converting circuit of claim 2, wherein the first voltage converting module further comprises a semiconductor transistor module fabricated on a third semiconductor substrate, the semiconductor transistor module comprises the power transistor, wherein a first terminal of the power transistor is configured to receive the bus voltage, a second terminal of the power transistor is configured to provide the interim voltage, and a control terminal of the power transistor is coupled to the first semiconductor module.

5. The voltage converting circuit of claim 2, wherein the first semiconductor module comprises one or more of the followings:
an input voltage sensing circuit configured to sense the bus voltage;
an active bleeder circuit configured to provide bleeding path for the bus voltage.

6. The voltage converting circuit of claim 1, wherein the first voltage converting module comprises the power transistor and a driving circuit configured to drive the power transistor, and wherein the power transistor is in ON state only when or mainly when the bus voltage is lower than a predetermined value.

7. The voltage converting circuit of claim 1, wherein:
the switching transistor having one end coupled to the output of the first voltage converting module;
the switching control circuit configured to control the switching transistor based on the output voltage; and
the chopping control circuit configured to provide the chopping control signal based on the interim voltage and an input voltage sensing signal indicative of the bus voltage.

8. The voltage converting circuit of claim 1, wherein the output of the first voltage converting module is coupled to a first end of a first capacitor, the second end of the inductor is coupled to a first end of an output capacitor, and wherein by coupling a second end of the first capacitor to the first end of the output capacitor, the second voltage converting module works as a buckboost converter, and wherein by coupling the second end of the first capacitor to a second end of the output capacitor, the second voltage converting module works as a buck converter.

9. The voltage converting circuit of claim 1, wherein the first voltage converting module and the second voltage converting module are manufactured in a chip package, wherein the chip package has five pins, wherein the first pin is configured to receive the bus voltage, the second pin is configured to provide the interim voltage, the third pin is coupled to an inductor, the fourth pin is coupled to a reference ground and the fifth pin is configured to sense the output voltage.

10. The voltage converting circuit of claim 9, further comprising:
a rectifying circuit having an input coupled to an alternating-current power source, a first output and a second output, wherein the first output is coupled to the first pin;
a first capacitor having a first end coupled to the second pin and having a second end coupled to the second output of the rectifying circuit;
the inductor having a first end coupled to the third pin; and
an output capacitor having a first end coupled to a second end of the inductor and the fifth pin, and having a second end coupled to the fourth pin.

11. The voltage converting circuit of claim 10, wherein:
when the second end of the first capacitor is coupled to the second end of the output capacitor, the second voltage converting module works as a buck converter; and
when the second end of the first capacitor is coupled to the first end of the output capacitor, the second voltage converting module works as a buckboost converter.

12. A chip package used in a non-isolating AC-DC voltage converting system, the chip package comprising:
a first die having a driving circuit configured to turn on a power transistor when a bus voltage supplied to a first end of the power transistor is at a valley region, wherein a second end the power transistor provides an interim voltage; and
a second die coupled to the second end of the power transistor, the second die comprising a switching transistor, a switching control circuit for controlling the switching transistor, and a chopping control circuit configured to provide a chopping control signal, and wherein the chopping control signal is supplied to the first die configured to control the ON and OFF state of the power transistor.

13. The chip package of claim 12, comprising:
a first pin configured to receive a bus voltage;
a second pin configured to provide an interim voltage, wherein the amplitude of the bus voltage is twice higher than the amplitude of the interim voltage;
a third pin coupled to an inductor;
a fourth pin coupled to a reference ground; and
a fifth pin configured to sense the output voltage.

14. The chip package of claim 13, further comprising a third die comprising the power transistor, wherein one terminal of the third die is coupled to the first pin, a second terminal of the third die is coupled to the second die and the second pin, and a control terminal of the third die is coupled to the first die.

15. The chip package of claim 14, further comprising a lead frame, wherein the lead frame comprises a first lead frame part having the third die mounted on, and wherein the first lead frame part is physically isolated from the rest of the lead frame and the first lead frame part is electrically coupled to the first pin.

16. The chip package of claim 13, wherein the first pin comprises a plurality of sub pins extending from a first side of the chip package, and the second pin, the third pin, the fourth pin and the fifth pin extend from a second side of the chip package which is opposite to the first side.

17. A non-isolating AC-DC voltage converting method comprising:

converting a bus voltage into an interim voltage by turning on a power transistor only or mainly at valley regions of the bus voltage; and converting the interim voltage into a regulated direct-current output voltage by a second voltage converter, and wherein the second voltage converter comprises a switching transistor, a switching control circuit for controlling the switching transistor and a chopping control circuit configured to provide a chopping control signal for controlling the power transistor.

18. The method of claim 17, further comprising manufacturing a driving circuit and a control circuit on two different semiconductor substrates, wherein the driving circuit is configured to drive the power transistor and the control circuit is configured to provide a control signal to the driving circuit.

19. The method of claim 17, further comprising:
coupling a source of the power transistor to a first end a first capacitor;
coupling an inductor of the second voltage converter to a first end of an output capacitor; and
when coupling a second end of the first capacitor to the first end of the output capacitor, the second voltage converter works as a buckboost converter, and when coupling the second end of the first capacitor to a second end of the output capacitor, the second voltage converter works as a buck converter.

* * * * *